(12) United States Patent
Trangbaek et al.

(10) Patent No.: US 12,038,292 B2
(45) Date of Patent: Jul. 16, 2024

(54) ADAPTIVE IN-DRIVE UPDATING OF ENERGY CONSUMPTION PREDICTION FOR VEHICLE WITH A LOAD

(71) Applicant: GM GLOBAL TECHNOLOGY OPERATIONS LLC, Detroit, MI (US)

(72) Inventors: Klaus Trangbaek, Ein Vered (IL); Vladimir Suplin, Modiin (IL); Daniel Urieli, Herzliya (IL)

(73) Assignee: GM Global Technology Operations LLC, Detroit, MI (US)

( * ) Notice: Subject to any disclaimer, the term of this patent is extended or adjusted under 35 U.S.C. 154(b) by 136 days.

(21) Appl. No.: 17/844,220

(22) Filed: Jun. 20, 2022

(65) Prior Publication Data

US 2023/0408272 A1 Dec. 21, 2023

(51) Int. Cl.
*G01C 21/34* (2006.01)
*B60W 40/10* (2012.01)
*B60W 40/13* (2012.01)
*B60W 50/00* (2006.01)
(Continued)

(52) U.S. Cl.
CPC ..... *G01C 21/3469* (2013.01); *B60W 40/1005* (2013.01); *B60W 40/13* (2013.01); *B60W 50/0097* (2013.01); *G01C 21/3446* (2013.01); *G01C 21/3492* (2013.01); *G01C 21/3617* (2013.01); *G06N 3/04* (2013.01); *B60W 2050/0022* (2013.01); *B60W 2530/10* (2013.01); *B60W 2530/16* (2013.01); *B60W 2552/25* (2020.02); *B60W 2555/20* (2020.02);
(Continued)

(58) Field of Classification Search
CPC ............... G01C 21/34; G01C 21/3469; G01C 21/3492; G01C 21/3617; G01C 21/3446; B60W 30/1005; B60W 30/13; B60W 50/0097; G06N 3/04
See application file for complete search history.

(56) References Cited

U.S. PATENT DOCUMENTS

| | | | |
|---|---|---|---|
| 2009/0143944 A1* | 6/2009 | Park | B60R 21/01336 701/45 |
| 2018/0143035 A1* | 5/2018 | Ricci | G01C 21/3469 |
| 2019/0107406 A1* | 4/2019 | Cox | G01S 19/42 |

FOREIGN PATENT DOCUMENTS

| | | |
|---|---|---|
| DE | 102015116600 A1 | 4/2017 |
| DE | 102016122402 A1 | 5/2017 |
| DE | 102021132088 A1 | 6/2022 |

* cited by examiner

*Primary Examiner* — John Kwon
*Assistant Examiner* — Johnny H Hoang
(74) *Attorney, Agent, or Firm* — Quinn IP Law

(57) ABSTRACT

A system for adaptive in-drive updating, for a vehicle travelling on a route, includes a controller having a processor and tangible, non-transitory memory. The vehicle is carrying a load. The controller is adapted to obtain one or more dynamic parameters pertaining to the load. A plurality of adaptive predictors is selectively executable by the controller at a timepoint during the route at which a completed portion of the route has been traversed by the vehicle and a remaining portion remains untraversed. The plurality of adaptive predictors includes a speed predictor configured to generate a global speed profile. The plurality of adaptive predictors includes a driving consumption predictor is configured to predict a driving consumption profile for the remaining portion of the route based in part on the dynamic parameter, the route features, the global speed profile, and a past drive consumption.

18 Claims, 5 Drawing Sheets

(51) Int. Cl.
*G01C 21/36* (2006.01)
*G06N 3/04* (2023.01)
(52) U.S. Cl.
CPC ..... *B60W 2555/40* (2020.02); *B60W 2555/60* (2020.02); *B60W 2556/10* (2020.02)

ADAPTIVE IN-DRIVE UPDATING OF ENERGY CONSUMPTION PREDICTION FOR VEHICLE WITH A LOAD

INTRODUCTION

The present disclosure relates to adaptive in-drive updating of the predicted energy consumption for a vehicle that is travelling on a route and carrying a load. In electric vehicles, predicting the amount of energy consumed by the vehicle along a specific route is valuable for a user in planning a trip. Due to various factors, a pre-drive prediction of the amount of energy consumed by the vehicle may be imprecise. If the vehicle is carrying a load, the energy consumption prediction may be significantly altered. Energy consumption predictors for new vehicle models requires extensive modelling and/or large amounts of data. However, modelling data for vehicles carrying a load may be rather sparse.

SUMMARY

Disclosed herein is a system for adaptive in-drive updating for a vehicle travelling on a route. The vehicle is carrying a load. The system includes a controller having a processor and tangible, non-transitory memory, with the controller being adapted to obtain one or more dynamic parameters pertaining to the load. A plurality of adaptive predictors ("plurality of" omitted henceforth) is selectively executable by the controller at a current timepoint during the route at which a completed portion of the route has been traversed by the vehicle and a remaining portion remains untraversed. The plurality of adaptive predictors includes a speed predictor configured to generate a global speed profile based in part on the one or more dynamic parameters, route features and a past actual speed.

The global speed profile is a concatenation of the past actual speed up to the current timepoint and predicted speed for the remaining portion of the route. The plurality of adaptive predictors includes a driving consumption predictor configured to predict a driving consumption profile for the remaining portion of the route based in part on the one or more dynamic parameters, the route features, the global speed profile, and a past drive consumption from the completed portion. In some embodiments, the load is located on a body of the vehicle. In some embodiments, the load is being towed by the vehicle.

The adaptive predictors include an auxiliary consumption predictor configured to predict an auxiliary consumption profile for the remaining portion of the route, based in part on the route features and past auxiliary consumption from the completed portion. The adaptive predictors include an energy consumption predictor configured to predict an energy consumption profile for the remaining portion of the route, based in part on a sum of the driving consumption profile and the auxiliary consumption profile. The route features may include altitude, changes in the altitude, temperature, traffic speed, speed limit and historical speed. The dynamic parameters may include a total mass of the vehicle with the load and/or a mass of the load. The dynamic parameters may include at least one of a roll resistance, drag coefficient and tire pressure of the vehicle.

In one embodiment, at least one of the adaptive predictors incorporates an adaptive predictor structure having a non-linear mapping function configured to generate a mapping output based in part on the route features and the global speed profile. A plurality of gain functions is adapted to determine respective gain values based in part on the mapping output. The respective gain values are based in part on respective driving data with respective ranges of the load. Here, the adaptive predictor structure includes a weighting function configured to determine a driving consumption output by interpolating the respective gain values based in part on the one or more dynamic parameters. The adaptive predictors include an energy consumption predictor configured to receive the driving consumption output.

In another embodiment, at least one of the adaptive predictors incorporates an adaptive predictor structure having a non-linear mapping function configured to generate a mapping output based in part on the route features and the global speed profile. Here, the adaptive predictor structure includes a gain function adapted to determine a gain value, based in part on the mapping output and driving data with a nominal load value, and a load-effect predictor configured to determine a load-effect factor, based in part on the mapping output and the one or more dynamic parameters. The adaptive predictors include an energy consumption predictor configured to determine a total energy consumed based in part on the load-effect factor and the gain value.

In another embodiment, at least one of the adaptive predictors incorporates an adaptive predictor structure having a merging neural network with a vehicle model network and an additive load-effect network. The vehicle model network includes a nominal input layer adapted to receive the route features and at least one nominal hidden layer. The additive load-effect network includes a load-effect input layer adapted to receive the one or more dynamic parameters and at least one load-effect hidden layer. The merging neural network includes a merged layer adapted to receive respective output from the at least one nominal hidden layer and the at least one load-effect hidden layer. The adaptive predictors include an energy consumption predictor configured to receive the respective output from the merged layer.

The route may be divided into segments. The controller may be configured to obtain at least one modification factor based on a comparison of the actual energy consumption and a pre-drive energy consumption prediction for the segments in the completed portion of the route. The controller may be configured to adjust the pre-drive energy consumption prediction for the segments in the remaining portion of the route based on the at least one modification factor.

Disclosed herein is a method of adaptive in-drive updating for a vehicle travelling on a route divided into a number of segments, the vehicle having a controller with a processor and tangible, non-transitory memory. The method includes obtaining one or more dynamic parameters pertaining to a load, via the controller, wherein the vehicle is carrying the load. The method includes selectively executing a plurality of adaptive predictors, via the controller, at a current timepoint during the route at which a completed portion of the route has been traversed by the vehicle and a remaining portion remains untraversed. A speed predictor is included in the plurality of adaptive predictors and configured to generate a global speed profile based in part on the one or more dynamic parameters, route features and a past actual speed, the global speed profile being a concatenation of the past actual speed up to the current timepoint and predicted speed for the remaining portion of the route. A driving consumption predictor is included in the plurality of adaptive predictor and configured to predict a driving consumption profile for the remaining portion of the route based in part on the one or more dynamic parameters, the route features, the global speed profile, and a past drive consumption from the completed portion.

The above features and advantages and other features and advantages of the present disclosure are readily apparent from the following detailed description of the best modes for carrying out the disclosure when taken in connection with the accompanying drawings.

Figure 1:
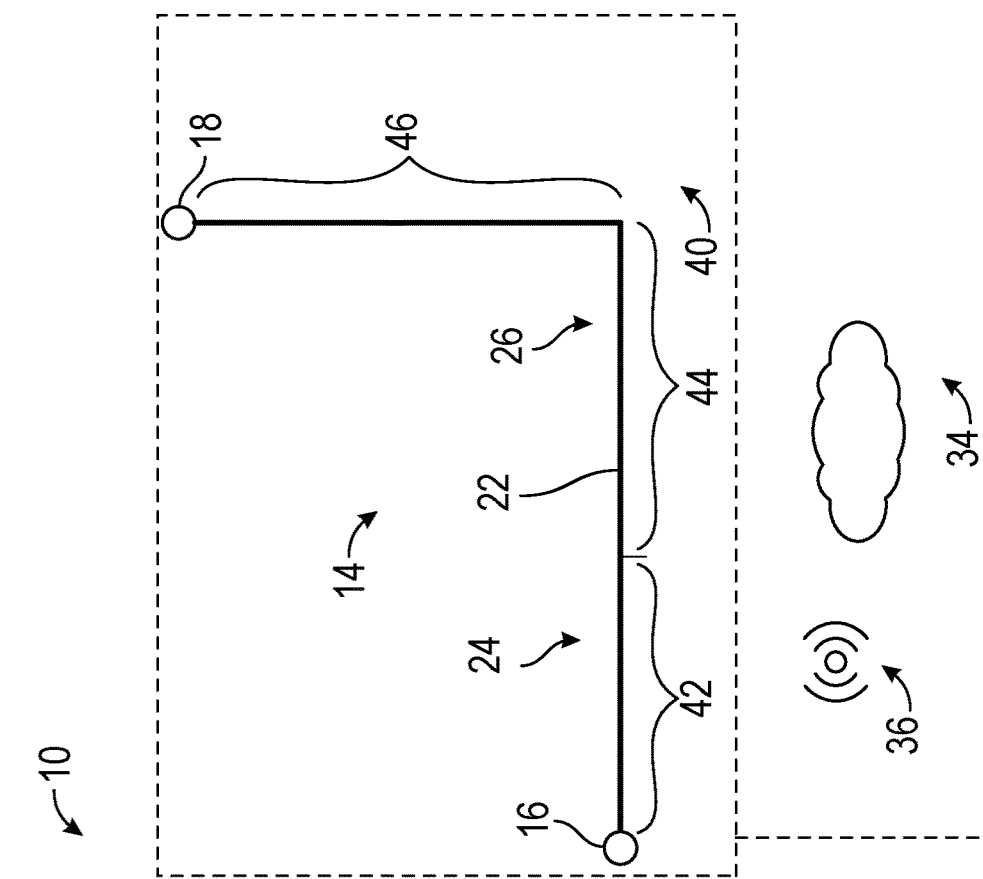
FIG. 1 is a schematic fragmentary diagram of a system for adaptive in-drive updating of energy consumption prediction for a vehicle carrying a load, the system having a plurality of adaptive predictors.
Figure 1:
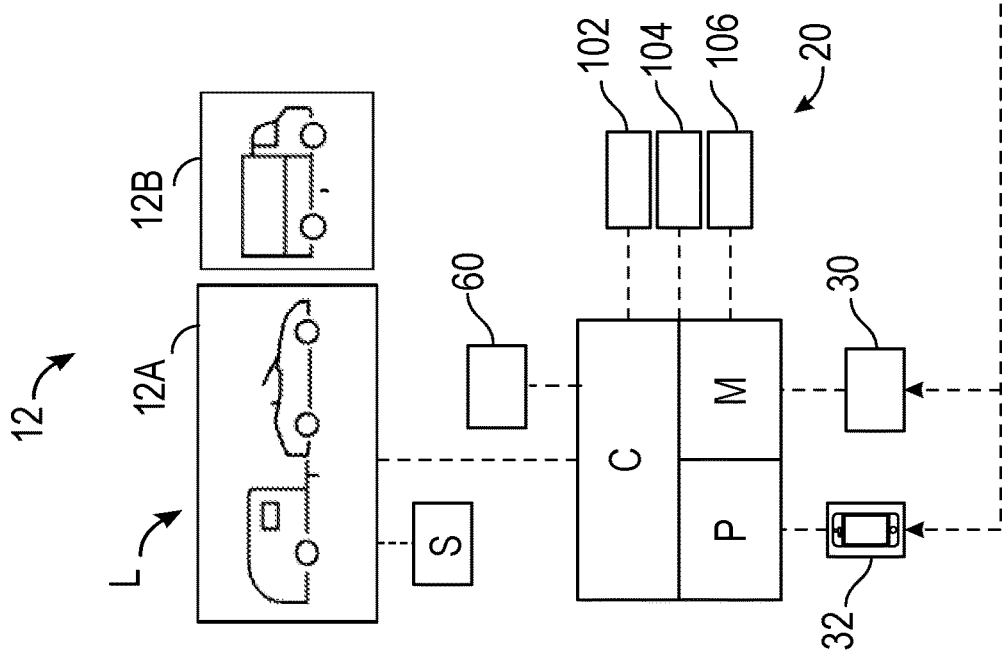

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Referring to the drawings, wherein like reference numbers refer to like components, FIG. 1 schematically illustrates an adaptive in-drive updating system 10 (referred to as "system" hereinafter) for a vehicle 12 having a load L, which may be carried in different ways. For example, the load L may be a trailer being dragged or towed, as shown by vehicle 12A in FIG. 1. The load L may be located on a body of the vehicle 12, such as cargo placed within the trunk or bed of a van/truck (e.g., vehicle 12B). The vehicle 12 may include, but is not limited to, a passenger vehicle, sport utility vehicle, light truck, heavy duty vehicle, minivan, bus, transit vehicle, bicycle, moving robot, farm implement (e.g., tractor), sports-related equipment (e.g., golf cart), boat, airplane and train. The vehicle 12 may be an electric vehicle, which may be purely electric or hybrid/partially electric. It is to be understood that the vehicle 12 may take many different forms and have additional components.

Referring to FIG. 1, the system 10 includes a controller C having at least one processor P and at least one memory M (or non-transitory, tangible computer readable storage medium) on which instructions may be recorded for executing a method 200 (described below with respect to FIG. 3) for in-drive updating of the predicted energy consumption of the vehicle 12 carrying the load L while travelling on a route. An example route 14 is shown in FIG. 1, beginning at origin 16 and ending at destination 18. An additive predictor structure is presented which takes advantage of baseline or no-load (e.g., non-towing) data.

Due to various factors, a pre-drive prediction of the amount of energy consumed by the vehicle 12 may be imprecise. Having an in-drive updated prediction of energy consumption by the vehicle 12 during a trip may be useful to alleviate range anxiety in the user. The system 10 rapidly adapts the predictions to the presence of a load L, such as a trailer. The system 10 incorporates one or more dynamic parameters pertaining to the load L which may include, but are not limited to, the mass of the load L, the mass of the vehicle 12 with the load L, a roll resistance, a drag coefficient and tire pressure of the vehicle 12.

The system 10 includes a plurality of adaptive predictors 20 ("plurality of" omitted henceforth) each receiving respective inputs and producing respective outputs. As described below, the adaptive predictors 20 may include machine learning modules performing a nonlinear mapping. These mappings may include neural networks, simple linear regression models, support vector regression models, or some combination of nonlinear functions (hinge/polynomial/saturations), linear gains and other types of models available to those skilled in the art. The gains and parameters may be learned by a data-driven approach.

Referring to FIG. 1, the adaptive predictors 20 are selectively executable by the controller C at a current timepoint 22 during the route 14 at which a completed portion 24 of the route has been traversed by the vehicle 12 and a remaining portion 26 remains untraversed. In other words, the updating is done in real-time while the vehicle 12 continues to remain on the route 14.

Figure 2:
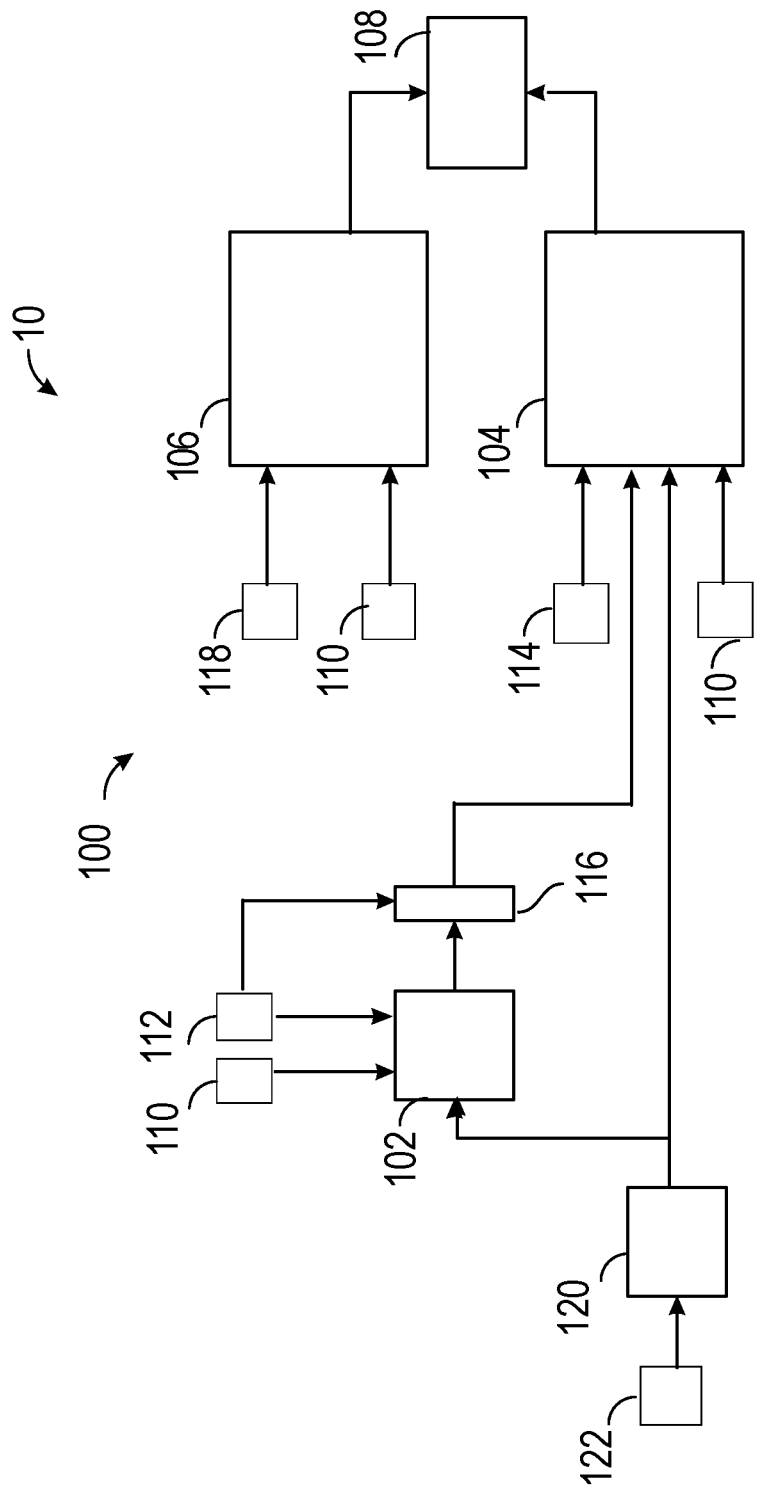
FIG. 2 is a schematic example of a modular architecture employable by the system of FIG. 1.

FIG. 2 is a schematic example of a modular architecture 100 employable by the system 10 for updating the predictions in a robust and accurate way. Referring to FIGS. 1-2, the adaptive predictors 20 include a speed predictor 102, a driving consumption predictor 104 and auxiliary consumption predictor 106. Referring to FIG. 2, the speed predictor 102 receives input from dynamic measurements 120 (via a dynamic parameter estimator 122), route features 110 and a past actual speed 112. Examples of route features 110 include altitude, changes in altitude, temperature, length, traffic speed, speed limit and historical speed.

The speed predictor 102 is configured to generate a global speed profile 116. The global speed profile 116 is a concatenation of the past actual speed up to the current timepoint and the predicted speed for the remaining portion 26. Thus, the global speed profile 116 reflects both past actual speed in the completed portion 24 and the predicted speed in the remaining portion 26. The speed predictor 102 models driving style to predict the speed of the vehicle 12 based in part on traffic conditions which may include, for example, live traffic data, peak hours, holidays, downstream traffic congestion level, road type, weather conditions and other factors. In some embodiments, the speed predictor 102 may be personalized for each driver.

Referring to FIG. 2, the driving consumption predictor 104 receives input from dynamic measurements 120 (via a dynamic parameter estimator 122), route features 110, past drive consumption 114 and the global speed profile 116. The driving consumption predictor 104 is configured to predict a driving consumption profile for the remaining portion 26 of the route 14 based in part on these inputs. The driving consumption predictor 104 models vehicle dynamics and components to predict a driving energy or primary energy consumed for purposes of moving the vehicle 12 (e.g., consumed by hybrid engine).

During the drive, the driving consumption predictor 104 uses the route features 110 for the entire route, measured consumption and speed of the completed portion 26 of the route 14, current estimate of dynamic parameters and current prediction of future speed to adaptively predict the future consumption. The driving consumption predictor 104 provides an estimate or prediction for the entire drive using the current parameter estimates and speed predictions.

Referring to FIGS. 1-2, the auxiliary consumption predictor 106 models energy consumption by the vehicle 12 for non-propulsion or auxiliary purposes, such as the energy consumed by an HVAC (heating, ventilation and air-conditioning) unit of the vehicle 12 or energy consumed for thermally conditioning a vehicle battery. Referring to FIG. 2, the auxiliary consumption predictor 106 predicts the auxiliary consumption profile based in part on the route features 110 and past auxiliary consumption 118 from the completed portion 24.

The driving consumption predictor 104 may incorporate a driving adaptor that compares the actual past consumption to the past consumption that would have been predicted using the current estimates. The driving adaptor provides a multiplier to adjust the consumption prediction profile accordingly. It is understood that the speed predictor 102 and the auxiliary consumption predictor 106 may incorporate similar adaptors that reconcile actual data and predicted data using multipliers.

Referring to FIG. 2, the outputs of the driving consumption predictor 104 and auxiliary consumption predictor 106 are summed together in an energy consumption predictor 108 to predict the energy consumption for the specific route plan. The modular structure enables faster generation of predictors for new vehicle models. In particular, the speed predictor 102 and auxiliary consumption predictor 106 may be transferrable between vehicle models with reasonable accuracy.

Figure 3:
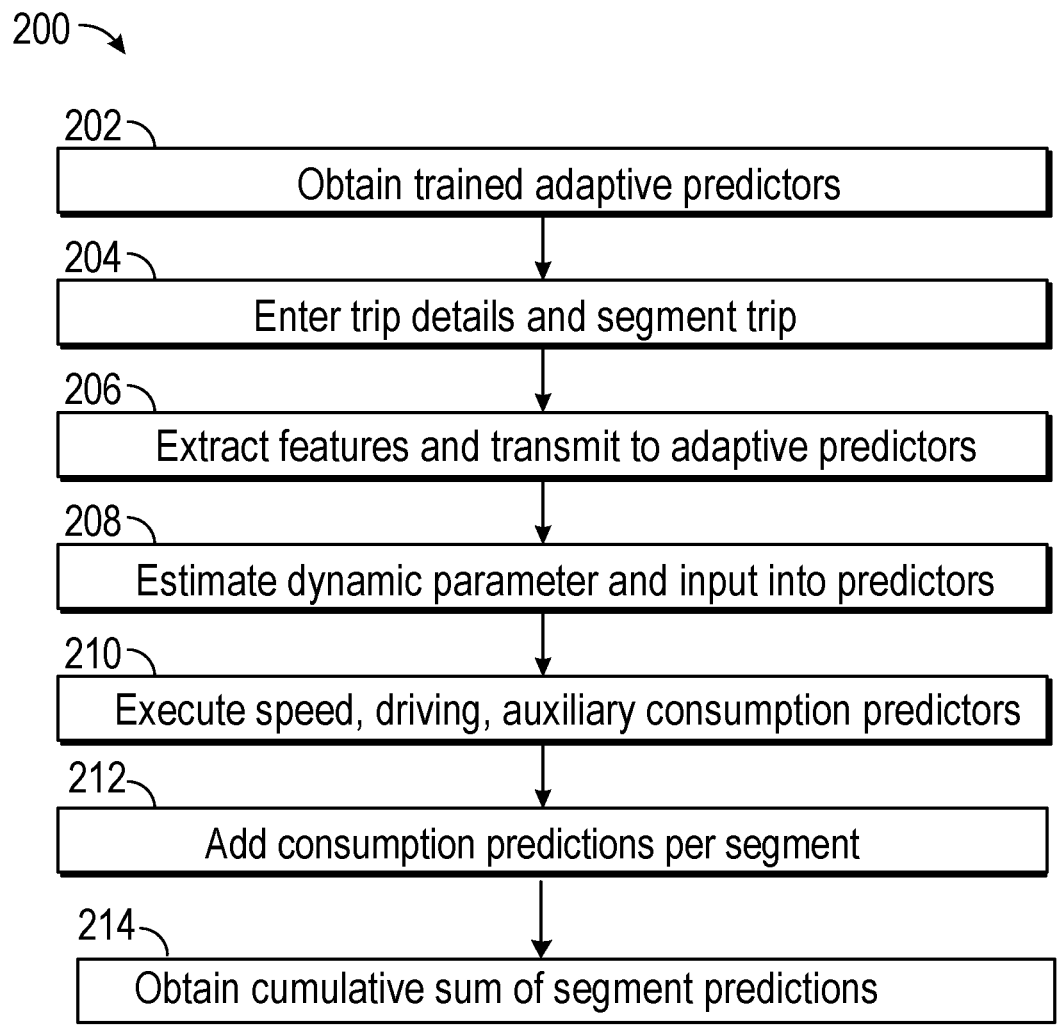
FIG. 3 is a flowchart of an example method for adaptive in-drive updating of energy consumption prediction for the vehicle of FIG. 1.

Referring now to FIG. 3, an example flowchart of the method 200 is shown. Method 200 may be embodied as computer-readable code or instructions stored on and partially executable by the controller C of FIG. 1. Method 200 need not be applied in the specific order recited herein and may be dynamically executed. Furthermore, it is to be understood that some steps may be eliminated. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Figure 4:
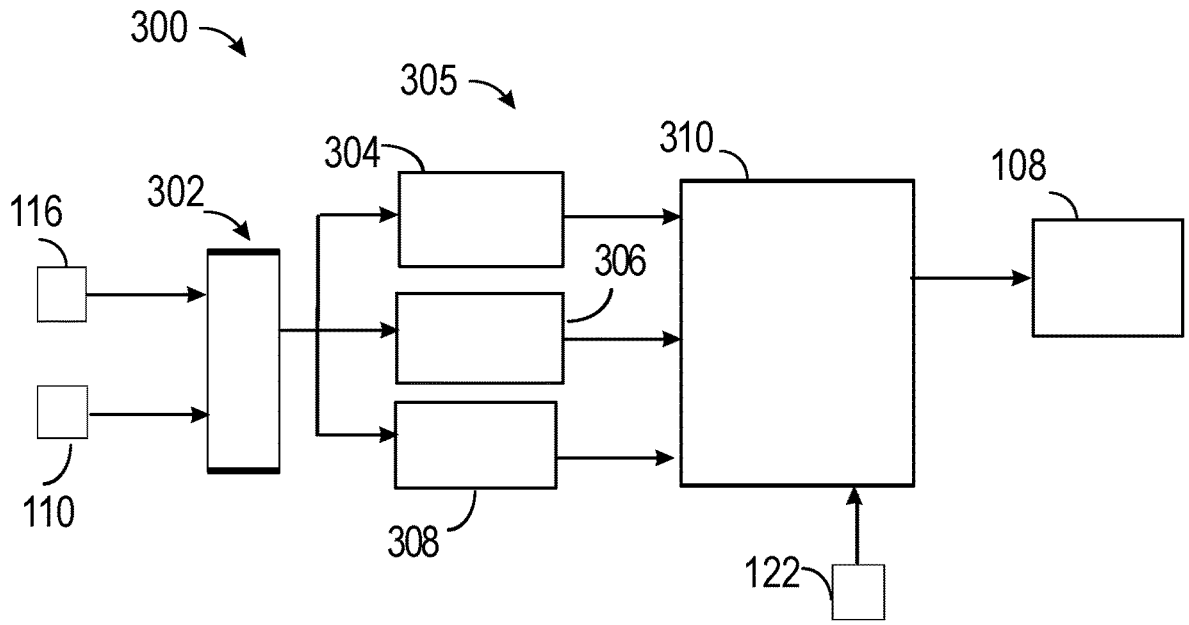
FIG. 4 is a schematic diagram of an example adaptive predictor structure employable by the system of FIG. 1.
Figure 5:
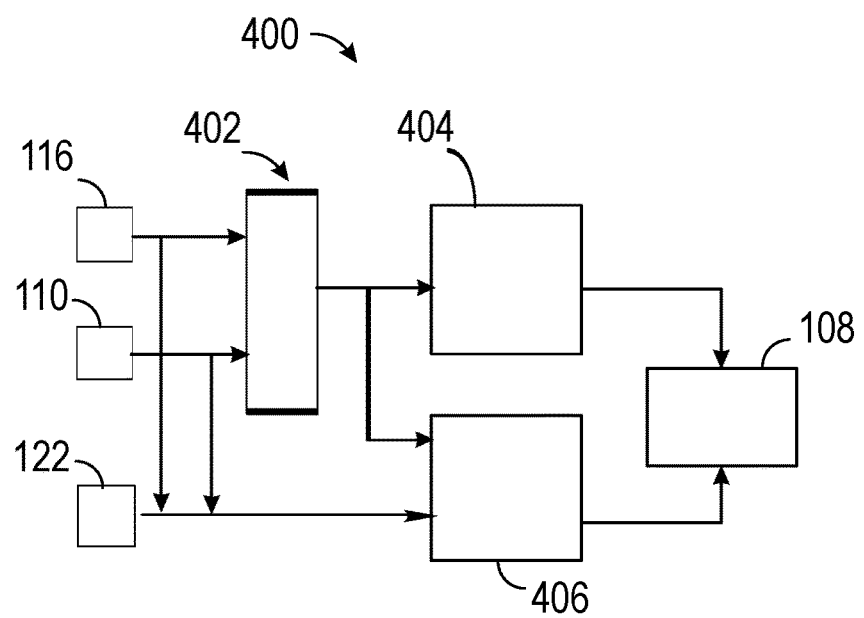
FIG. 5 is a schematic diagram of another example adaptive predictor structure employable by the system of FIG. 1.
Figure 6:
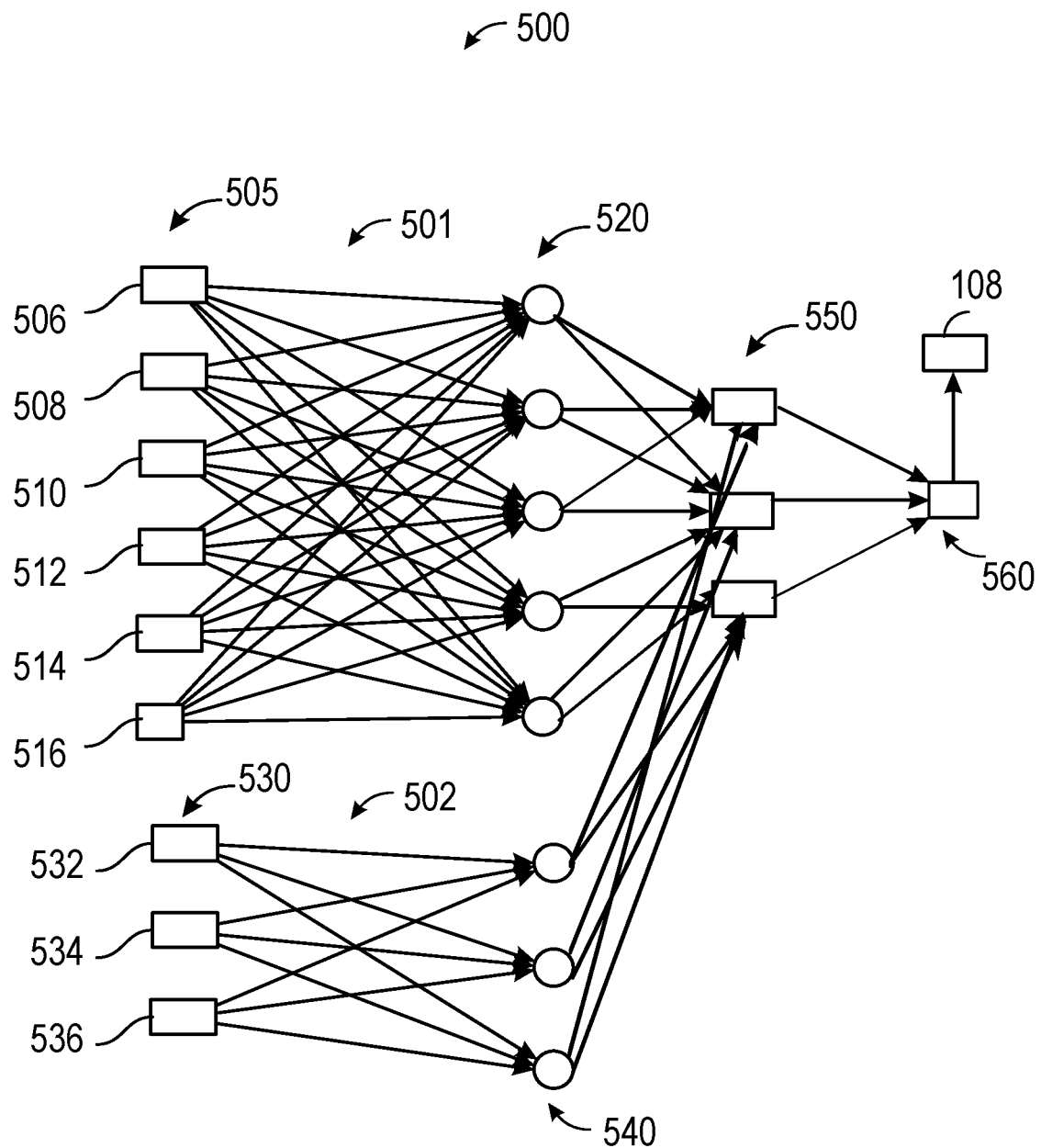
FIG. 6 is a schematic diagram of yet another example adaptive predictor structure employable by the system of FIG. 1.

Per block 202 of FIG. 3, the method 200 includes obtaining trained adaptive predictors 20. FIGS. 4-6 respectively show three embodiments of adaptive predictor structures that may be employed by the plurality of adaptive predictors 20. The speed predictor 102, the driving consumption predictor 104 and/or the auxiliary consumption predictor 106 may employ the same or different predictor structures.

Referring to FIG. 4, an example adaptive predictor structure 300 is shown. The predictor structure 300 includes a non-linear mapping function 302 configured to receive the route features 110 and the global speed profile 116 (of past and predicted speed) and generate a mapping output. Example structures for the non-linear mapping function 302 include hinge functions, polynomials, saturations and neural networks.

Referring to FIG. 4, the mapping output is transmitted to a plurality of gain functions 305 which determine respective gain values based in part on the mapping output, for transmission to a weighting function 310. The respective gain values are based in part on respective driving data with a variable load or different ranges of the load. Referring to FIG. 4, the weighting function 310 determines a driving consumption output by interpolating the respective gain values based in part on the dynamic parameters (via dynamic parameter estimator 122). The driving consumption output is transmitted to the energy consumption predictor 108.

The respective gain values are learned from data where the dynamic parameter estimate is in the range between baseline and some predetermined value. For example, the plurality of gain functions 305 may include a first gain function 304, a second gain function 306 and a third gain function 308. The first gain function 304 generates a gain value (e.g., Go) based in part on driving data with a zero or negligible or baseline load value, referred to herein as the "nominal load value." When the dynamic parameter estimate is close to the nominal or baseline case, the consumption prediction is close to Go. The second gain function 306 may generate a gain value based in part on driving data with the load L being between the nominal load value and a second load value that is higher than the nominal load value. The third gain function 308 generates a gain value based in part on driving data with the load L being between the second load value and a third load value that is higher than the second load value. The prediction is weighted average of the gain values, according to the dynamic parameter estimate. Weighting provides interpolation according to the closeness of parameter estimate to the sample parameter value.

Another example adaptive predictor structure 400 is shown in FIG. 5. The predictor structure 400 includes a non-linear mapping function 402 configured to generate a mapping output based in part on the route features 110 and the global speed profile 116 (of past and predicted speed). Example structures for the non-linear mapping function 402 include hinge functions, polynomials, saturations and neural networks. Referring to FIG. 5, the mapping output is transmitted to a gain function 404 and a load-effect predictor 406. The gain function 404 determines a gain value based in part on the mapping output and driving data with a nominal load value. The load-effect predictor 406 generates a load-effect factor based in part on the mapping output and the dynamic parameters (via dynamic parameter estimator 122).

When the dynamic parameter estimate is close to the nominal or baseline no-load case, the load-effect predictor 406 outputs zero. The gain value and the load-effect factor are transmitted to the energy consumption predictor 108 which determine a total energy consumed based in part on the load-effect factor and the gain value. This structure makes it possible to transfer the load effect predictor to new vehicle models as an initial estimate.

Another example adaptive predictor structure, a merging neural network 500, is shown in FIG. 6. The merging neural network 500 has a vehicle model network 501 and an additive load-effect network 502. The merging neural network 500 includes weighted neurons, which may be non-linear multivariate functions. The vehicle model network 501 is of higher complexity than the additive load-effect network 502, reflecting the higher availability of data. Referring to FIG. 6, the vehicle model network 501 includes a nominal input layer 505 and at least one nominal hidden layer 520 adapted to receive each of the route features 110 as inputs 506, 508, 510, 512, 514, 516 etc.

Referring to FIG. 6, the additive load-effect network 502 includes a load-effect input layer 530 and a load-effect hidden layer 540. The number of hidden layers in the merging neural network 500 may be varied based on the application at hand. The load-effect input layer 530 is adapted to receive the dynamic parameters (e.g., via dynamic parameter estimator 122) as inputs 532, 534, 536 etc. Referring to FIG. 6, a merged layer 550 is adapted to receive respective output from both the nominal hidden layer 520 and the load-effect hidden layer 540. The energy consumption predictor 108 receives the respective output 560 from the merged layer 550.

Advancing to block 204 of FIG. 3, the method 200 includes obtaining details of the route 14. Referring to FIG. 1, the pre-drive route plan may be entered through a communications interface 30 that is accessible to a user or operator of the vehicle 12. For example, a route planner may generate candidate routes and send them to the predictor to get their predicted consumption, which helps in selecting an energy efficient route. The planned route, along with other factors, e.g., distance, altitude, live traffic, weather, driver characteristics etc. are fed into the adaptive predictors 20.

The communications interface 30 may include a touchscreen or other IO device and may be integrated in the infotainment unit of the vehicle 12. In some embodiments, the route plan may be entered through a mobile application 32 that is in communication with the controller C. For example, the mobile application 32 may be physically connected (e.g., wired) to the controller C as part of the vehicle infotainment unit. The mobile application 32 may be embedded in a smart device belonging to a user of the vehicle 12 and plugged or otherwise linked to the vehicle 12. The circuitry and components of a mobile application 32 ("apps") available to those skilled in the art may be employed. The communications interface 30 may also be employed for vehicle-to-vehicle (V2V) communication and/or a vehicle-to-everything (V2X) communication.

Block 204 may include segmenting the route 14. Referring to FIG. 1, the route 14 may be divided into multiple different segments 40. In the example shown, the segments 40 include a first segment 42, second segment 44 and third segment 46. Each individual segment 40 may be made up of multiple smaller segments or sub-segments in the collecting and processing phase. In one embodiment, the segments 40 may be about 4 kilometers each. The sizes of the segments 40 may vary.

Proceeding to block 206 of FIG. 3, the method 200 includes extracting and transmitting route features 110 (see FIG. 2) from the segments 40. This may be done via a feature extractor 60 in communication with the controller C, shown in FIG. 1. The feature extractor 60 is adapted to extract various features (for example, through computer programming that converts available information into a specific format) from the route plan, in-vehicle and external sensors and other sources. The route features may include traffic data (e.g., live speed, speed limits, and historical speed of each of the trip segments time data (e.g., time taken by the trip segments 40 based on time of day, day of the week) and weather information (e.g., temperature, wind speed, wind direction and UV index).

Advancing to block 208 of FIG. 3, the controller C is programmed to estimate one or more dynamic parameters (e.g., via dynamic parameter estimator 122), and input them into the adaptive predictors 20. The controller C also retrieves the pre-drive energy consumption prediction and the actual energy consumption for the segments in the completed portion 24 of the route 14. The dynamic parameters may include total mass, load mass, roll resistance, drag coefficient and tire pressure. The dynamic parameters may be estimated from dynamic measurements from one or more sensors S (see FIG. 1) each capable of measuring a respective physical factor and sending a respective signal to the controller C. For example, the sensors S may include a suspension deflection sensor, roll sensor and a tire pressure sensor. As alternative to physical sensors, virtual software replacements may be used. Additionally, controller C may be programmed to determine the respective physical factors by inputting the respective signals into a model or other estimation technique available to those skilled in the art.

An example of a dynamic parameter estimator is presented below. Here, the total mass TM of the vehicle 12 plus the load L is estimated from longitudinal acceleration and axle torques. The mass of the load L may not be available prior to the drive. The total mass TM may be estimated with a longitudinal force balance equation as follows:

$$TM = \frac{Faxle - Fdrag - Froll}{Ax}$$

Here $A_x$ is the measured longitudinal acceleration, $F_{axle}$ is the force produced by an electric motor (not shown) in the vehicle 12 (estimated from motor currents), $F_{drag}$ is the drag force estimated from the speed of the vehicle 12 and $F_{roll}$ is the roll resistance estimated from velocity or data from sensors S. Early estimates of the total mass TM may be made from driver input and load detection.

Proceeding to block 210 of FIG. 3, the controller C is programmed to execute the speed predictor 102 and the driving consumption predictor 104. The speed predictor 102 receives the route features 110 as input, including route information (e.g., latitude and longitude of each of the trip segments elevation, length of each of the segments 40, the road classification or quality), average traffic speed per segment and weather information (e.g., temperature, wind speed, wind direction and UV index). The output of the adaptive speed predictor 102 is the predicted average vehicle speed (AVS) per segment, which is transferred into the driving consumption predictor 104. The predicted average vehicle speed (AVS) may be determined based in part on the average traffic speed (ATS), a squared value of the average traffic speed (ATS$^2$) and a set of coefficients (a, b, c) as follows: [AVS=a+b*ATS+c*ATS$^2$]. The parameters a, b, and c are learned from a training process using driving data.

The driving consumption predictor 104 receives the output of the speed predictor 102 and the route features 110 (e.g., obtained by the feature extractor 60). The output of the adaptive driving consumption predictor 104 is the predicted driving energy (energy to propel the vehicle 12) consumed for each trip segment 40.

The driving consumption predictor 104 may calculate multiple hinge functions based on the predicted average vehicle speed (AVS). By way of example, the hinge functions may be MAX (0, AVS), MAX (0, AVS−90), MAX (0, AVS−105) and MAX (0, AVS−115), where the predicted average vehicle speed is in kilometers per hour. For example, if the predicted average vehicle speed is 95 kilometers per hour, the four hinge functions would have the values {95, 5, 0, 0}. If the predicted average vehicle speed is 60 kilometers per hour, the four hinge functions would have the values {60, 0, 0, 0}. The hinge functions may be employed to select an appropriate aerodynamic mathematical model for the driving consumption predictor 104. For example, the surface friction and/or wind resistance encountered by a vehicle 12 changes with its speed and affect the driving energy consumed.

Continuing with block 210 of FIG. 3, the controller C is programmed to execute the auxiliary consumption predictor

106. The auxiliary consumption predictor 106 is adapted to predict the non-propulsion energy consumed by the vehicle 12, such as by an HVAC (heating, ventilation and air-conditioning) unit in the vehicle 12 (with the aid of various coefficients learned from past HVAC data, energy consumed for thermally conditioning a vehicle battery etc.

Proceeding to block 212 of FIG. 3, the method 200 includes adding the drive and auxiliary consumption predictions per segment, to obtain a predicted total energy consumed by the vehicle 12 for each of the segments 40. Referring to FIG. 2, the respective outputs of the driving consumption predictor 104 and the auxiliary consumption predictor 106 are summed or added together to generate the total energy consumption per segment for the vehicle 12 for the route plan. This allows a user of the vehicle 12 having load L to better anticipate range or fuel concerns pertaining to the route 14, as well as compare energy consumption for different route plans. The modular architecture allows using predictor components as a part of a consumption monitoring system to detect anomalies within the vehicle 12. In other words, the predicted total energy consumption may be used for performance monitoring of the vehicle 12.

Advancing to block 214 of FIG. 3, the method 200 includes obtaining a cumulative sum of each of the segment predictions. Block 214 may include interpolating the predictions in each waypoint (or sub-segment) between the beginning and end of a full segment ("super segment").

The controller C of FIG. 1 may be an integral portion of, or a separate module operatively connected to, other controllers of the vehicle 12. For example, the controller C may be an electronic control unit (ECU) of the vehicle 12. The memory M can store controller-executable instruction sets, and the processor P can execute the controller-executable instruction sets stored in the memory M.

Referring to FIG. 1, in some embodiments, the adaptive predictors 20 may be stored in a remotely located or "off-board" cloud computing service, referred to herein as cloud unit 34, that interfaces with the controller C and/or the mobile application 32. The cloud unit 34 may include one or more servers hosted on the Internet to store, manage, and process data, maintained by an organization, such as for example, a research institute or a company. The adaptive predictors 20 may be updateable via remote updates.

Referring to FIG. 1, the controller C may be configured to communicate with the cloud unit 34 via a wireless network 36. The wireless network 36 of FIG. 1 may be a short-range network or a long-range network. The wireless network 36 may be a communication BUS, which may be in the form of a serial Controller Area Network (CAN-BUS). The wireless network 36 may incorporate a Bluetooth™ connection, a Wireless Local Area Network (LAN) which links multiple devices using a wireless distribution method, a Wireless Metropolitan Area Network (MAN) which connects several wireless LANs or a Wireless Wide Area Network (WAN). Other types of connections may be employed.

In summary, the system 10 (via execution of the method 200) provides a robust way of obtaining in-drive updates for a vehicle 12 carrying a load L. The system 10 combines a predefined route prediction with in-drive updates, adapting rapidly to the load L (e.g., trailer mass estimates). The modular architecture (shown in FIG. 2) allows for mixing of prediction models of different types for the adaptive predictors 20. The various adaptive predictor structures (shown in FIGS. 4-6) enable a rapid transfer of general vehicle models and load-effect models to new vehicle models.

The controller C of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, a physical medium with patterns of holes, a RAM, a PROM, an EPROM, a FLASH-EEPROM, other memory chip or cartridge, or other medium from which a computer can read.

Look-up tables, databases, data repositories or other data stores described herein may include various kinds of mechanisms for storing, accessing, and retrieving various kinds of data, including a hierarchical database, a set of files in a file rechargeable energy storage system, an application database in a proprietary format, a relational database energy management system (RDBMS), etc. Each such data store may be included within a computing device employing a computer operating system such as one of those mentioned above and may be accessed via a network in one or more of a variety of manners. A file system may be accessible from a computer operating rechargeable energy storage system and may include files stored in various formats. An RDBMS may employ the Structured Query Language (SQL) in addition to a language for creating, storing, editing, and executing stored procedures, such as the PL/SQL language mentioned above.

The flowchart in FIG. 3 illustrates an architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based rechargeable energy storage systems that perform the specified functions or acts, or combinations of specific purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system for adaptive in-drive updating for a vehicle travelling on a route, the system comprising:
    a controller having a processor and tangible, non-transitory memory, the vehicle carrying a load, the controller being adapted to obtain one or more dynamic parameters pertaining to the load;
    a plurality of adaptive predictors selectively executable by the controller at a current timepoint during the route at which a completed portion of the route has been traversed by the vehicle and a remaining portion remains untraversed, the plurality of adaptive predictors including:
        a speed predictor configured to generate a global speed profile based in part on the one or more dynamic parameters, route features and a past actual speed, the global speed profile being a concatenation of the past actual speed up to the current timepoint and predicted speed for the remaining portion of the route; and
        a driving consumption predictor configured to predict a driving consumption profile for the remaining portion of the route based in part on the one or more dynamic parameters, the route features, the global speed profile, and a past drive consumption;
    wherein at least one of the plurality of adaptive predictors includes each of a non-linear mapping function, a plurality of gain functions, and a weighting function;
    wherein the non-linear mapping function is configured to generate a mapping output based in part on the route features and the global speed profile;
    wherein the plurality of gain functions is adapted to determine respective gain values based in part on the mapping output, the respective gain values being based in part on respective driving data with respective ranges of the load; and
    wherein the weighting function is configured to determine a driving consumption output by interpolating the respective gain values based in part on the one or more dynamic parameters.

2. The system of claim 1, wherein the load is located on a body of the vehicle.

3. The system of claim 1, wherein the load is being towed by the vehicle.

4. The system of claim 1, wherein the plurality of adaptive predictors includes an auxiliary consumption predictor configured to predict an auxiliary consumption profile for the remaining portion of the route based in part on the route features and past auxiliary consumption from the completed portion, and wherein the speed predictor and the auxiliary consumption predictor are transferrable between respective vehicle models.

5. The system of claim 4, wherein the plurality of adaptive predictors includes an energy consumption predictor configured to predict an energy consumption profile for the remaining portion of the route based in part on a sum of the driving consumption profile and the auxiliary consumption profile.

6. The system of claim 1, wherein the route features include altitude, changes in the altitude, temperature, traffic speed, speed limit and historical speed.

7. The system of claim 1, wherein the one or more dynamic parameters is a total mass of the vehicle with the load and/or a mass of the load.

8. The system of claim 1, wherein the one or more dynamic parameters includes at least one of a roll resistance, drag coefficient and tire pressure of the vehicle.

9. The system of claim 1, wherein at least one of the plurality of adaptive predictors incorporates an adaptive predictor structure having:
    a merging neural network with a vehicle model network and an additive load-effect network;
    wherein the vehicle model network includes a nominal input layer adapted to receive the route features and at least one nominal hidden layer;
    the additive load-effect network includes a load-effect input layer adapted to receive the one or more dynamic parameters and at least one load-effect hidden layer;
    the merging neural network includes a merged layer adapted to receive respective output from the at least one nominal hidden layer and the at least one load-effect hidden layer; and
    the plurality of adaptive predictors includes an energy consumption predictor configured to receive the respective output from the merged layer.

10. The system of claim 1, wherein the route is divided into segments and the controller is configured to:
    obtain at least one modification factor based on a comparison of an actual energy consumption and a pre-drive energy consumption prediction for the segments in the completed portion of the route; and
    adjust the pre-drive energy consumption prediction for the segments in the remaining portion of the route based on the at least one modification factor.

11. The system of claim 1, wherein one or more dynamic parameters include a total mass of the vehicle with the load, determined as:

$$\left[\frac{F_{axle} - F_{drag} - F_{roll}}{A_x}\right],$$

wherein $A_x$ is a measured longitudinal acceleration, $F_{axle}$ is a force produced by an electric motor in the vehicle, $F_{drag}$ is a drag force estimated from the predicted speed of the vehicle, and $F_{roll}$ is a roll resistance of the vehicle.

12. A method of adaptive in-drive updating for a vehicle travelling on a route divided into a number of segments, the vehicle having a controller with a processor and tangible, non-transitory memory, the method comprising:

obtaining one or more dynamic parameters pertaining to a load, via the controller, wherein the vehicle is carrying the load;

executing selectively a plurality of adaptive predictors, via the controller, at a current timepoint during the route at which a completed portion of the route has been traversed by the vehicle and a remaining portion remains untraversed;

including a speed predictor in the plurality of adaptive predictors, the speed predictor being configured to generate a global speed profile based in part on the one or more dynamic parameters, route features and a past actual speed, the global speed profile being a concatenation of the past actual speed up to the current timepoint and predicted speed for the remaining portion of the route;

including a driving consumption predictor in the plurality of adaptive predictors, the driving consumption predictor being configured to predict a driving consumption profile for the remaining portion of the route based in part on the one or more dynamic parameters, the route features, the global speed profile, and a past drive consumption;

incorporating a non-linear mapping function, a gain function and a load-effect predictor in at least one of the plurality of adaptive predictors;

generating a mapping output based in part on the route features and the global speed profile, via the non-linear mapping function;

determining a gain value based in part on the mapping output and driving data with a nominal load value, via the gain function; and determining a load-effect factor based in part on the mapping output and the one or more dynamic parameters, via the load-effect predictor, the plurality of adaptive predictors including an energy consumption predictor configured to determine a total energy consumed based in part on the load-effect factor and the gain value.

13. The method of claim 12, further comprising:

including an auxiliary consumption predictor in the plurality of adaptive predictors, the auxiliary consumption predictor being configured to predict an auxiliary consumption profile for the remaining portion of the route based in part on the route features and past auxiliary consumption from the completed portion, and wherein the speed predictor and the auxiliary consumption predictor are transferrable between respective vehicle models.

14. The method of claim 13, further comprising:

predicting an energy consumption profile for the remaining portion of the route based in part on a sum of the driving consumption profile and the auxiliary consumption profile, via the energy consumption predictor.

15. The method of claim 12, further comprising:

including in the one or more dynamic parameters at least one of a roll resistance, drag coefficient, tire pressure, a total mass of the vehicle with the load or a mass of the load.

16. The method of claim 12, further comprising:

incorporating a merging neural network with a vehicle model network and an additive load-effect network in at least one of the plurality of adaptive predictors;

receiving the route features via a nominal input layer in the vehicle model network;

transmitting a respective output from the nominal input layer to at least one nominal hidden layer in the vehicle model network;

receiving the one or more dynamic parameters via a load-effect input layer in the additive load-effect network;

transmitting the respective output from the load-effect input layer to at least one load-effect hidden layer in the additive load-effect network; and receiving the respective output from the at least one nominal hidden layer and the at least one load-effect hidden layer via a merged layer in the merging neural network, the plurality of adaptive predictors including an energy consumption predictor configured to receive the respective output from the merged layer.

17. The method of claim 12, further comprising:

incorporating a total mass of the vehicle with the load in the one or more dynamic parameters; and obtaining the total mass of the vehicle with the load as:

$$\left[\frac{F_{axle} - F_{drag} - F_{roll}}{A_x}\right],$$

wherein $A_x$ is a measured longitudinal acceleration, $F_{axle}$ is a force produced by an electric motor in the vehicle, $F_{drag}$ is a drag force estimated from the predicted speed of the vehicle, and $F_{roll}$ is a roll resistance of the vehicle.

18. A system for adaptive in-drive updating for a vehicle travelling on a route, the system comprising:

a controller having a processor and tangible, non-transitory memory, the vehicle carrying a load, the controller being adapted to obtain one or more dynamic parameters pertaining to the load;

wherein the one or more dynamic parameters includes at least one of a roll resistance, drag coefficient, tire pressure, and a total mass of the vehicle with the load;

a plurality of adaptive predictors selectively executable by the controller at a current timepoint during the route at which a completed portion of the route has been traversed by the vehicle and a remaining portion remains untraversed, the plurality of adaptive predictors including:

a speed predictor configured to generate a global speed profile based in part on the one or more dynamic parameters, route features and a past actual speed, the global speed profile being a concatenation of the past actual speed up to the current timepoint and predicted speed for the remaining portion of the route;

a driving consumption predictor configured to predict a driving consumption profile for the remaining portion of the route based in part on the one or more dynamic parameters, the route features, the global speed profile, and a past drive consumption;

an auxiliary consumption predictor configured to predict an auxiliary consumption profile for the remaining portion of the route based in part on the route features and past auxiliary consumption from the completed portion, wherein the speed predictor and the auxiliary consumption predictor are transferrable between respective vehicle models;

wherein at least one of the plurality of adaptive predictors includes each of a non-linear mapping function, a plurality of gain functions, and a weighting function;

wherein the non-linear mapping function is configured to generate a mapping output based in part on the route features and the global speed profile;

wherein the plurality of gain functions is adapted to determine respective gain values based in part on the mapping output, the respective gain values being based in part on respective driving data with respective ranges of the load; and wherein the weighting function is configured to determine a driving consumption output by interpolating the respective gain values based in part on the one or more dynamic parameters.

\* \* \* \* \*